(No Model.)

5 Sheets—Sheet 1.

C. KUHLEWIND.
GLASS PRESS.

No. 561,056.

Patented May 26, 1896.

WITNESSES

INVENTOR
Cornelius Kuhlewind
by Bakewell & Bakewell
his attys.

(No Model.) 5 Sheets—Sheet 2.

C. KUHLEWIND.
GLASS PRESS.

No. 561,056. Patented May 26, 1896.

WITNESSES INVENTOR (No Model.) 5 Sheets—Sheet 3.

C. KUHLEWIND.
GLASS PRESS.

No. 561,056. Patented May 26, 1896.

WITNESSES
INVENTOR (No Model.) 5 Sheets—Sheet 4.
C. KUHLEWIND.
GLASS PRESS.
No. 561,056. Patented May 26, 1896.
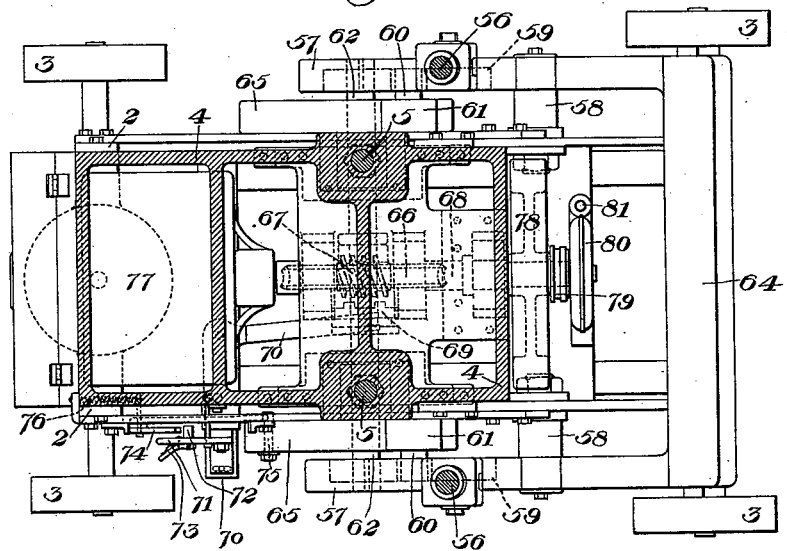
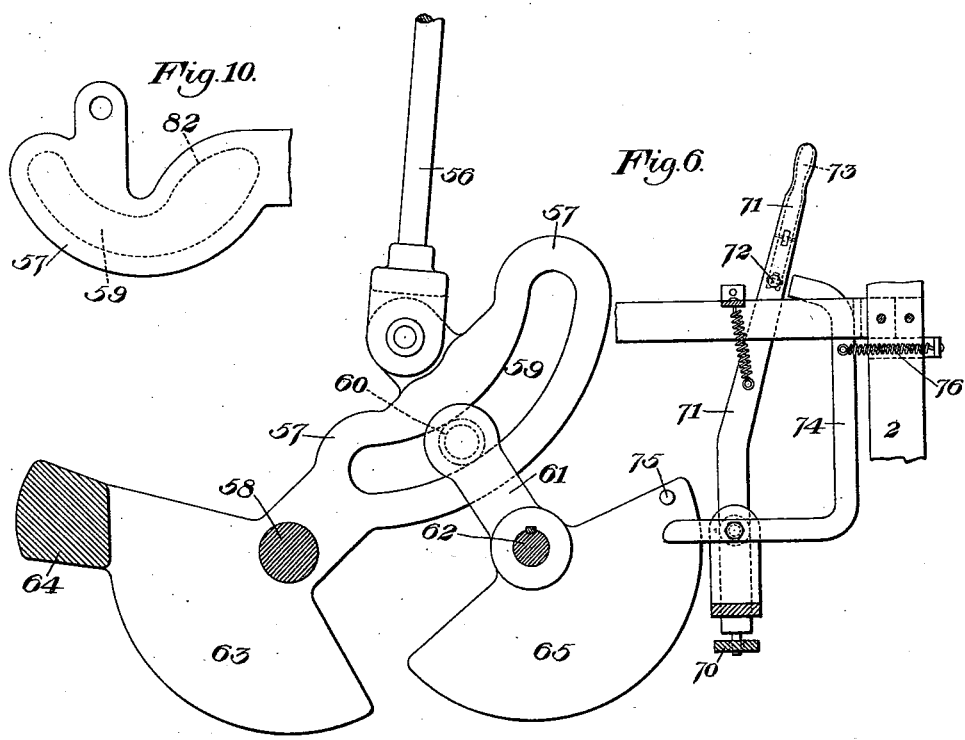
WITNESSES
INVENTOR
Cornelius Kuhlewind
by Bakewell & Bakewell
his attys.

(No Model.)
C. KUHLEWIND.
GLASS PRESS.
No. 561,056.  Patented May 26, 1896.
5 Sheets—Sheet 5.
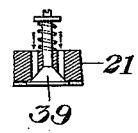
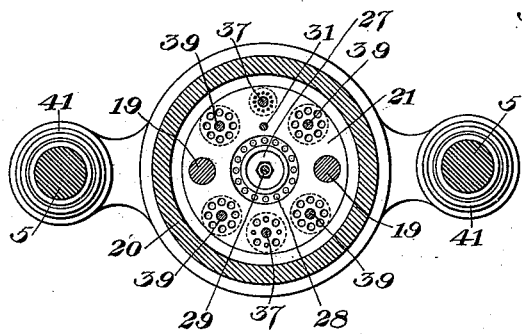
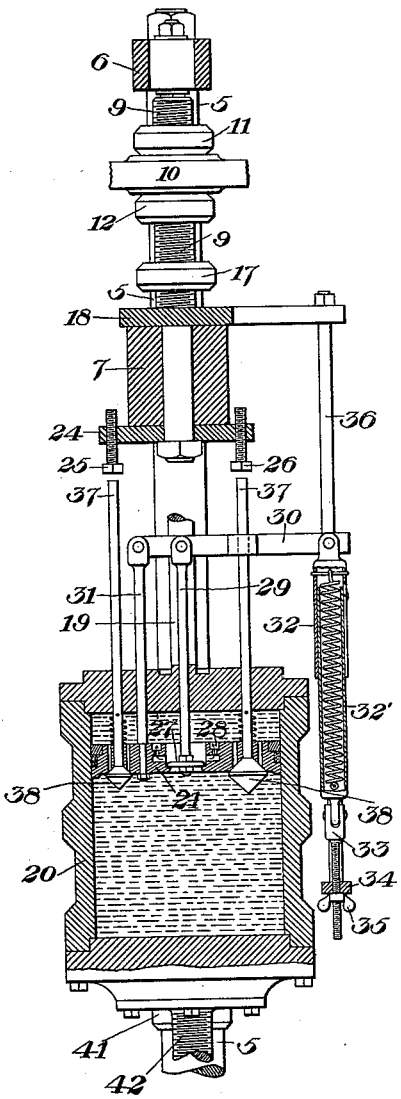
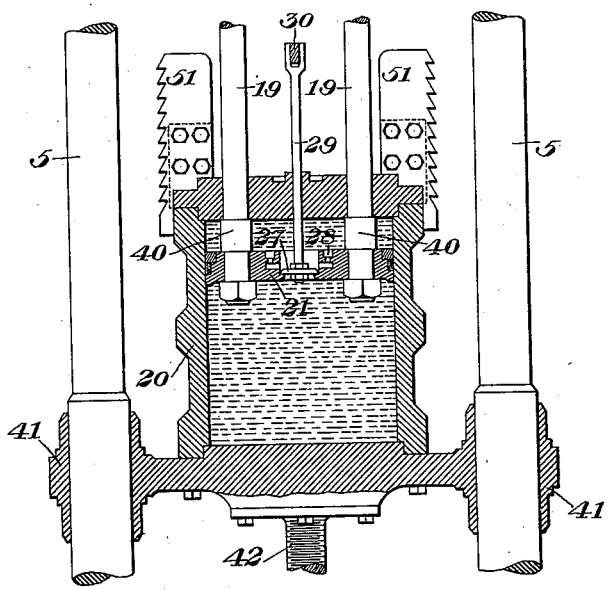
WITNESSES
INVENTOR
Cornelius Kuhlewind
by Bakewell & Bakewell
his attys.

UNITED STATES PATENT OFFICE.

CORNELIUS KUHLEWIND, OF PITTSBURG, PENNSYLVANIA, ASSIGNOR OF THREE-FOURTHS TO EDWARD G. WATERS, JULIUS C. CALISCH, AND LEO R. ISENTHAL, OF SAME PLACE.

GLASS-PRESS.

SPECIFICATION forming part of Letters Patent No. 561,056, dated May 26, 1896.

Application filed December 5, 1895. Serial No. 571,147. (No model.)

*To all whom it may concern:*

Be it known that I, CORNELIUS KUHLEWIND, of Pittsburg, in the county of Allegheny and State of Pennsylvania, have invented a new and useful Improvement in Glass-Presses, of which the following is a full, clear, and exact description, reference being had to the accompanying drawings, in which—

Figure 1:
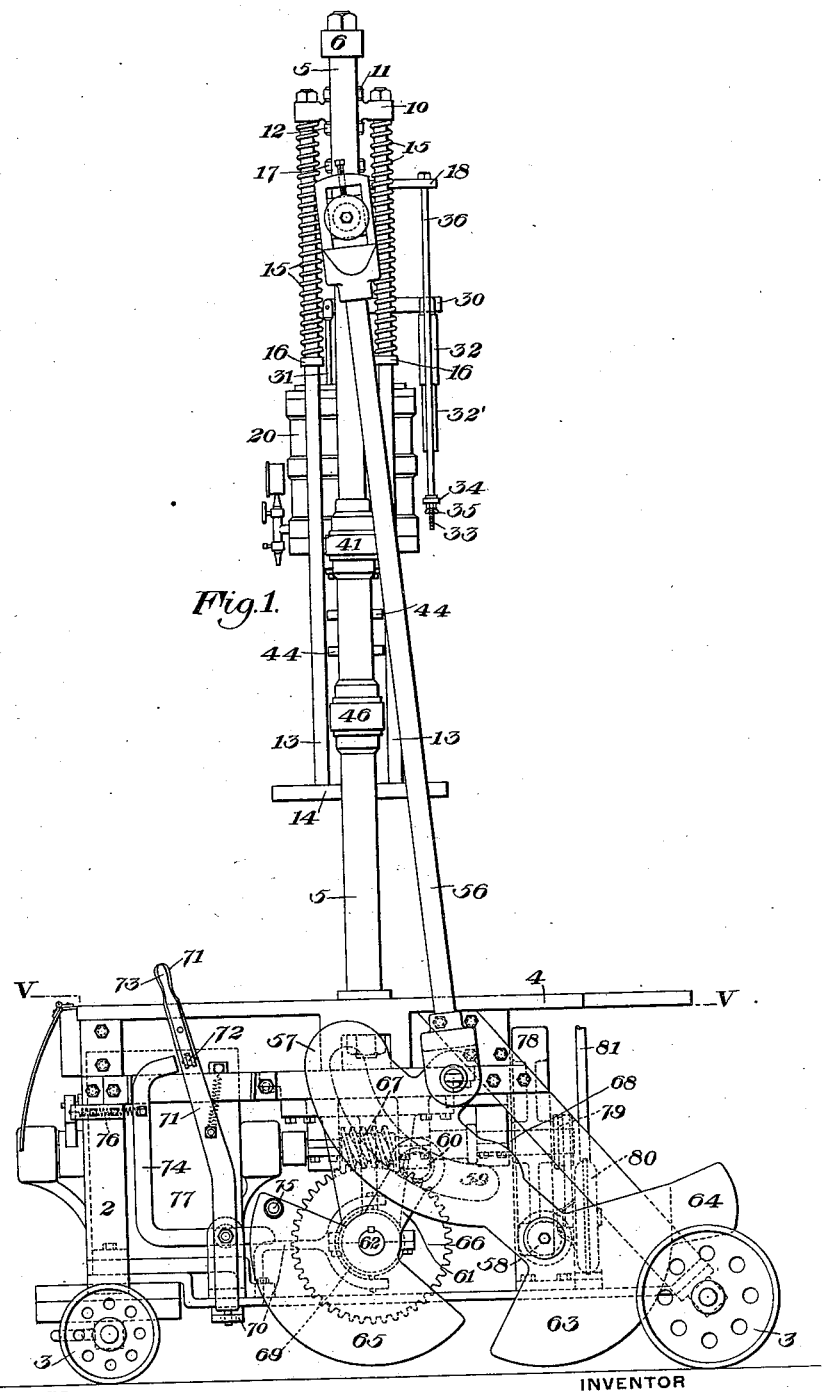
Figure 2:
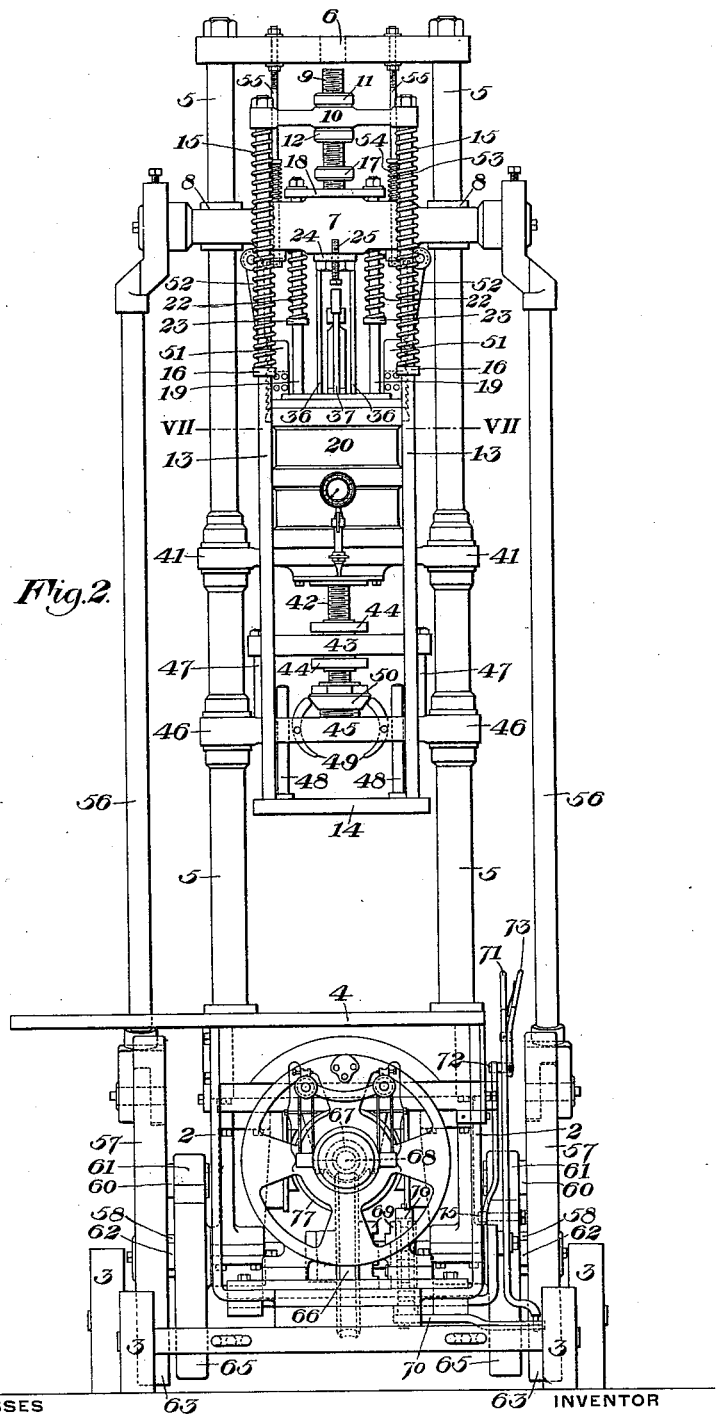
Figure 3:
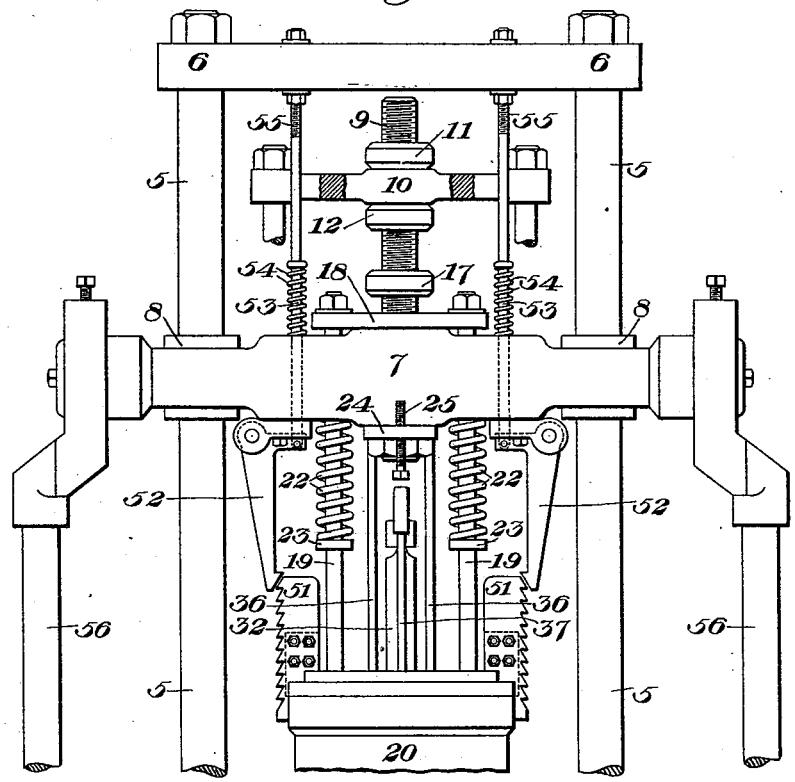
Figure 4:
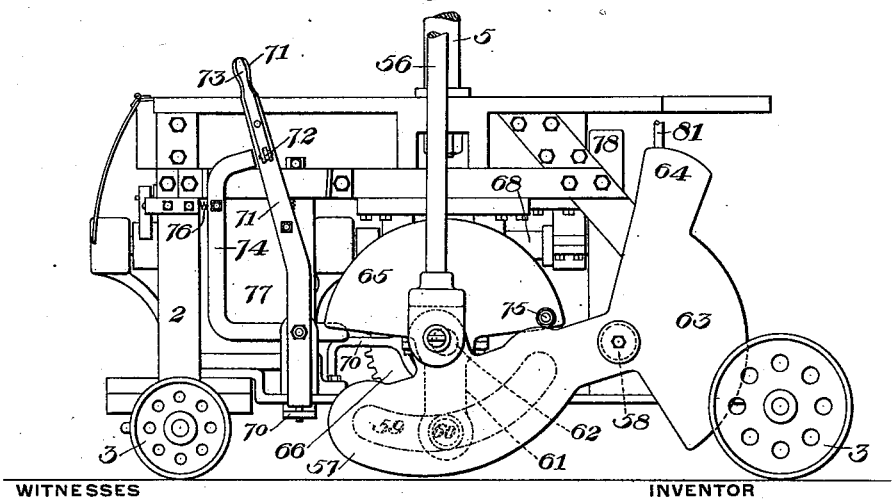

Figure 1 is a side elevation of my improved press. Fig. 2 is a front elevation of the same, the motor-shield being removed. Fig. 3 is an enlarged front elevation showing the cross-head in the same position as in Fig. 2. Fig. 4 is a similar view showing the actuating-cam and connections. Fig. 5 is a cross-sectional view on the line V V of Fig. 1. Fig. 6 is an enlarged inner elevation of the cam and its connections. Fig. 7 is a cross-section on the line VII VII of Fig. 2. Fig. 8 is an end elevation, partly in section. Fig. 9 is a side elevation, partly in section. Fig. 10 is a modified form of cam-plate, and Fig. 11 is a detail view of one of the automatically-opening valves of the piston-head.

My invention relates to the type of glass-presses set forth in my former patent, No. 543,154, granted on July 23, 1895, and is designed to improve the action thereof by giving a motion more nearly approximating that where the machine is operated by hand, as well as to apply a rotary motor thereto and to improve the general structure and arrangement of the parts.

In the drawings, 2 represents the frame forming the base portion of the machine, which is carried upon wheels 3 and supports the base-plate 4. Upon this base-plate are secured the upright posts 5 5, which are joined at their upper ends by cross-piece 6. Between these uprights moves the cross-head 7, guided by its collars 8, which encircle the posts, this cross-head having centrally secured therein the vertical screw-threaded rod 9, which is adjustably fastened at its upper end to the plate 10 by nuts 11 and 12. Through the plate 10 pass four depending rods 13, which at their lower ends carry the presser-plate 14, they being normally held in depressed position by springs 15, bearing against the lower face of the plate, and shoulders or collars 16 upon the rods. The screw-threaded rod 9 is provided with an adjustable nut or tappet 17, which, in the downward movement of the cross-head 7, contacts with a cross-bar 18 through a hole in which the rod loosely passes. Secured in the cross-bar 18 are rods 19, which pass through the cross-head 7 and the head of a hydraulic cylinder 20, and are secured to a piston-head 21 therein. Spiral springs 22 encircle the rods 19 and bear against the lower face of the cross-head, and collars 23 upon these rods, thus giving a yielding pressure upon the piston-head.

To the lower face of the cross-head are secured two frames or braces 24, preferably formed by the protruding ends of a single plate, these ends or braces carrying adjustable screw-threaded tappets 25 and 26, respectively. The piston-head 21 of the hydraulic cylinder is provided with a central aperture closed by an upwardly-opening valve 27, having side ports 28 and a stem 29, which extends up through the piston-head and is pivotally connected with a lever 30, the end of which is pivoted to a standard 31, also secured in the piston-head. Pivotally connected to the outer end of the lever 30 is a depending tube 32, within which telescopes a second tube 32', a spiral spring being placed within the tubes and secured thereto by pins, as shown in Fig. 9. To the lower end of the inner tube is pivoted a depending link 33, the lower end of which is screw-threaded, and passing through a hole in a cross-bar 34 is engaged by a thumb-nut 35. The cross-bar 34 is supported by rods 36, depending from the cross-head, as shown. Any desired tension may thus be brought upon the lever.

Through the upper cylinder-head extend the stems 37 of downwardly-opening valves 38, the ends of these stems being adapted to engage the tappets 25 after the cross-head has moved downwardly a determined distance. The piston-head is also provided with four downwardly-opening valves 39, the stems of these valves being short and provided with springs which press against collars on the stems and normally hold the valves to their seats. When an upward pressure is applied to the piston in the cylinder, these valves open automatically and allow the fluid above the piston-head to flow through it as it rises.

To prevent the upward movement of the piston-head beyond a certain point, I provide collars 40, surrounding the rods 19, within the cylinder, these collars being arranged to abut against the upper cylinder-head. The lower cylinder-head is provided with extensions having collars 41 surrounding the standard 5, and guiding the cylinder in its movements, and centrally secured to this head is the screw-spindle 42, to which is adjustably fastened a cross-bar 43 by means of the adjustable nuts 44. Rigidly secured to the lower end of the screw-spindle is a cross-head 45, having collars 46, which take about the standards 5, and within suitable holes in this cross-head move the guiding-rods 47, which are secured in the ends of the cross-bar 43. Through other holes in this cross-head move the guide-rods 48, secured to the pressure-plate 14, and pivoted within it are the usual clamp-levers 49, which take under a collar at the upper end of the plunger and support it, they being operated and secured by the conical nut 50, working upon the screw-spindle. Upon opposite sides of the upper end of the cylinder are secured the ratchet-bars 51, the teeth of which in certain positions are engaged by the lower pawl-shaped ends of bell-crank levers 52, which are pivoted to the cross-head. The upper ends of these bell-crank levers are loosely pivoted to rods 53, which extend up through the cross-head and are normally held in elevated position by springs 54. With the upper ends of these rods 53, when the cross-head reaches the upper limit of its movement, engage depending adjustable tappets 55, secured to the upper cross-piece 6. This pawl-and-ratchet mechanism just described is provided for the purpose of positively moving the plunger upwardly before the presser-plate is retracted, the pawls moving over the ratchet-teeth as the piston descends in the cylinder, while upon the upward movement the pawls, engaging certain of the teeth, move the cylinder, and consequently the plunger, upwardly in a positive manner, thus affording a mechanical connection between the cross-head and the cylinder during the upward movement and until the guide-rods strike the upper tappets, when the pawls will be disengaged from the ratchet-teeth. A suitable pressure-gage is provided upon one side of the cylinder, as shown, to indicate the pressure upon the oil or other fluid in the cylinder.

The cross-head 7 is actuated by the depending links 56 pivoted thereto, these links being pivotally connected at their lower ends to cam-plates 57, secured to the opposite ends of a shaft 58. Each cam-plate, as shown more clearly in Fig. 6, is provided with an inner curved slot or groove 59, the opposite faces of which form the cam-surfaces, which are acted upon by a roller 60, projecting outwardly from an arm 61, secured to the counter-shaft 62. The cam-plates are provided upon the opposite sides of the shaft with counterweights 63, which are connected by a bar 64. Counterweights 65 are also provided upon the counter-shaft 62, and this shaft is centrally provided with a worm-wheel 66, which is driven by a worm or screw 67 upon the main driving-shaft 68. The wheel 66 revolves loosely upon the shaft, and to couple it to the shaft I employ an ordinary clutch 69, which is actuated by a lever 70, which is operated by means of the hand-lever 71. Projecting through the hand-lever 71 is a post 72, which is secured at the end of a small spring-pressed lever 73, this post being adapted to be engaged by a curved lever 74, pivoted to the frame and adapted to be engaged by a pin 75 upon one of the counterweights 65, the lever 74 being normally held in retracted position by a spring 76. By reason of this mechanism if the hand-lever is pushed rearwardly and the clutch thrown into gear, the machine will make one revolution, and then, by the lever 74, the clutch is thrown out of gear and the machine stops, while by pressing the hand upon the small lever carrying the post 72 the machine will operate continuously.

The main driving-shaft 68 is driven by a suitable electric motor 77, secured at its front end, this shaft having also at its rear end a fly-wheel 78 and a small pulley 79, which is belted to the pulley upon the shaft of a blower 80, from which leads a pipe 81 to supply air for cooling the molds.

The peculiar actuating connections for the links 56 are provided for the purpose of giving to the plunger and presser-plate a motion very closely approximating that where it is worked by hand, it affording a slow downward movement, a short retention of the cross-head in the depressed position, and then a quick upward movement. Thus at the starting of the motion the roller 60, moving along the outer surface of the cam-slot, draws the cross-head slowly downward, and after it has reached the lowermost position it travels along in the slot which is then concentric with the center of motion, after which the roller travels along the inner face of the slot and gives a quick upward motion.

In operating the machine the mold containing a suitable amount of glass is placed upon the base-plate 4, and the clutch being thrown into gear the rods 56 draw down the cross-head 7 with a slow downward movement, and the plunger is forced down with an easy yielding pressure to start the flow of glass in the mold. As soon as the nut 17 strikes the bar 18, however, the plunger is forced positively downward, the cylinder acting as a solid connection, thus pressing the glass into shape. If too much glass is placed in the mold, so that the pressure rises above a certain amount, the valve 27 is lifted against the spring-pressure, allowing the fluid to flow upwardly through the piston, so that on further downward movement the piston moves downwardly in the cylinder, the cylinder and plunger remaining stationary. At a determined point in the downward movement the tappets 25 and 26 open the valves 38 and allow the fluid to rise in the cylinder. On the return movement of the cross-head the oil flows through the downwardly-opening valves in the piston, which resumes its former position in the cylinder.

In Fig. 10 I show a slightly-modified form of cam-plate, wherein the outer end of the slot is enlarged somewhat, as shown at 82, the pivot being moved toward the other end of the slot. This gives a slightly longer retention of the cross-head in the depressed position and affords a better leverage for beginning the quick upward motion.

The advantages of my invention will be apparent to those skilled in the art, since a machine is afforded which gives a movement similar to that of an operation by hand. The upward movement of the plunger before the presser-plate rises is insured by the action of the ratchet-plates upon the cylinder and their coaction with the pawls upon the cross-head. The screw-gear enables a rotary motor to be employed which moves at a high rate of speed, thus enabling the blower to be used upon the motor-shaft. The peculiar cam connection between the depending rods and the driving-shaft forms a material part of my invention and gives a better movement than is provided in the press of my former patent.

By the words "two-part former" in the claims I intend to cover any reciprocatory forming element in a press one part of which is movable relatively to the other. This two-part former in the machine shown herein consists of the cylinder secured to the plunger and the piston movable within the cylinder and actuated by the cross-head.

Many changes may be made in the form and arrangement of the parts without departing from my invention, since

What I claim is—

1 In a press, a reciprocating two-part former, one part being secured to a cylinder, and the other part being connected to a piston within the cylinder, the parts having also a mechanical separable connection, and means for operating said connection; substantially as described.

2. In a press, a two-part former, one part being secured to a cylinder, and the other part being connected to a valved piston within the cylinder, and having also a pawl-and-ratchet connection with the cylinder; substantially as described.

3. In a press, a reciprocating two-part former, one part being secured to a cylinder, and the other to a piston therein, a valve in said piston, having a yieldingly-pressed stem, the parts having also a mechanical separable connection, and means for operating said connection; substantially as described.

4. In a press, a two-part former, one part being secured to a cylinder and the other connected to a valved piston within the cylinder, pawls upon the latter part arranged to engage ratchets upon the first part, and tappets arranged to disengage the pawls upon the return stroke; substantially as described.

5. In a press, a two-part former, one part being secured to a cylinder, and the other to a valved piston within the cylinder, depending rods pivotally connected to one of said parts, a pivoted cam-plate pivotally connected with said rods, and an actuated shaft, having an arm provided with a roller bearing upon said cam-plate, the cam-plate being arranged to give a slow downward movement, a short retention in the depressed position, and a quick upward movement; substantially as described.

In testimony whereof I have hereunto set my hand.

CORNELIUS KUHLEWIND.

Witnesses:
G. I. HOLDSHIP,
H. M. CORWIN.